United States Patent [19]

Kawai et al.

[11] Patent Number: 4,874,995

[45] Date of Patent: Oct. 17, 1989

[54] PASSIVE SEAT BELT DEVICE

[75] Inventors: Osamu Kawai; Shunji Mizumura, both of Fujisawa, Japan

[73] Assignee: Nippon Seiko Kabushiki Kaisha, Tokyo, Japan

[21] Appl. No.: 259,406

[22] Filed: Oct. 18, 1988

Related U.S. Application Data

[63] Continuation of Ser. No. 12,660, Feb. 9, 1987, abandoned.

[30] Foreign Application Priority Data

Feb. 14, 1986 [JP] Japan ................................. 61-29034
Jun. 12, 1986 [JP] Japan ................................. 61-134796

[51] Int. Cl.⁴ .............................................. H02H 7/08
[52] U.S. Cl. ..................................................... 318/484
[58] Field of Search ................... 318/484; 307/105 B; 180/268, 269, 270; 280/801, 802, 803, 804, 806, 807, 808; 361/23, 28, 25, 26

[56] References Cited

U.S. PATENT DOCUMENTS

| | | | |
|---|---|---|---|
| 2,986,685 | 5/1961 | Epstein | 361/26 X |
| 4,393,342 | 7/1983 | Matsuoka et al. | 318/282 |
| 4,489,804 | 12/1984 | Kamijo | 280/807 X |
| 4,569,536 | 2/1986 | Tsuge et al. | 280/807 |
| 4,655,312 | 4/1987 | Frantom et al. | 280/807 X |
| 4,659,108 | 4/1987 | Sack et al. | 280/807 |

FOREIGN PATENT DOCUMENTS

| | | | |
|---|---|---|---|
| 54-2447 | 2/1979 | Japan . | |
| 55-170150 | 12/1980 | Japan . | |
| 59-45241 | 3/1984 | Japan | 280/807 |
| 0495888 | 11/1938 | United Kingdom | 361/26 |

*Primary Examiner*—Bentsu Ro
*Attorney, Agent, or Firm*—Shapiro and Shapiro

[57] ABSTRACT

A passive seat belt device for fastening and releasing a seat belt by driving the seat belt comprises a motor for driving the seat belt, a calculator for calculating motor energization time or power supplied to the motor and a controller for controlling the motor in accordance with the output of the calculator.

12 Claims, 9 Drawing Sheets

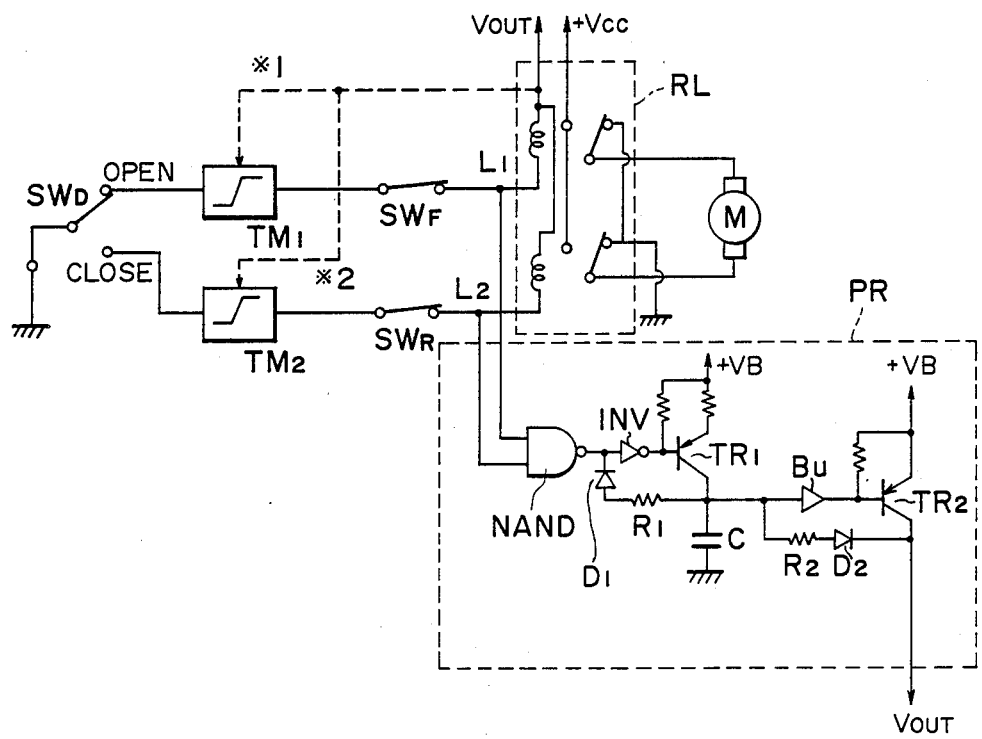
F I G. 2

PASSIVE SEAT BELT DEVICE

This is a continuation of application Ser. No. 012,660 filed Feb. 9, 1987, now abandoned.

BACKGROUND OF THE INVENTION

1. Field of the Invention

The present invention relates to a passive seat belt device which automatically fastens and releases a seat belt by driving the seat belt, and more particularly to a seat belt device having means to protect a motor for driving the seat belt from an overload.

2. Related Background Art

In a passive seat belt device of the relevant type, an end of the belt is attached to a movable member, called a slider or runner, which is driven back and forth by a motor along a rail mounted to the vehicle body. The runner travels between a release position at a front or release end of the rail and a fasten position at a rear or fasten end of the rail. In such a device, the motor may be subject to overload and damage if, for example, the runner does not reach the fasten end (rear end) or release end an intermediate point of the rail. Devices intended to solve this problem are known in which a circuit breaker is inserted at an input of the motor or a timer is inserted in a drive circuit for the motor so that the motor is stopped a predetermined time after the application of a motor drive signal.

FIG. 1 shows a prior art circuit in which both the circuit breaker and the timer are provided in order to prevent the overload of the motor. $SW_D$ denotes a door switch, $TM_1$ and $TM_2$ denote timers, $SW_F$ and $SW_R$ denote limit switches respectively arranged at the front and rear ends of the rail, RL denotes a relay circuit, C/B denotes a circuit breaker and M denotes a motor.

When the vehicle door is opened, the door switch is thrown to an "open" position and the motor is rotated to drive the runner to the release (front) end of the rail. The limit switch $SW_F$ is arranged at the release end. Thus, when the runner reaches the release end, the switch $SW_F$ is turned off and the motor stops. When the door is closed, the runner is driven to the fasten end and the limit switch $SW_R$ at the fasten end is turned off so that the motor is stopped.

The drive device described above is expensive. However, use of the timers or circuit breaker alone can lead to problems. In the former case (timers only), if the runner stops between the ends of the rail and the door is opened and closed, forward and backward drive currents may be alternately supplied to the motor and the motor may be damaged. In the latter case (circuit breaker only), if the runner often stops at an intermediate position when a driver turns off the engine and leaves the vehicle, the motor is intermittently energized during a long time period and the vehicle battery is discharged.

Even if both the timer circuit and the circuit breaker are used as shown in FIG. 1, problems may still be encounterd. For example, let us assume that the runner stops halfway when it is driven forward but it smoothly moves backward. In such a case, the seat belt can fasten and secure an occupant as normal, but trouble may occur under the following condition.

When the door is opened under such a circumstance, the runner tends to move forward but it stops halfway. The circuit breaker is actuated before the timer $TM_1$ times out, and the motor is deenergized. If the door is then closed, the circuit energizes the relay to drive the runner backward. However, since the circuit breaker is off, the motor does not rotate. If the circuit breaker is turned on within the set time of the timer $TM_2$ and the runner is moved backward to the fasten position, no problem arises. However, if the timer first times out, the backward movement of the runner is blocked, and the runner is not moved to the rear end and the seat belt cannot fasten about the occupant, in spite of the fact that actual trouble is in moving the runner forward.

In this case, the set time of the timer $TM_2$ for the backward movement of the runner may be extended, but there is a limit on the set time from the standpoint of prevention of damage to the motor. Thus, a combination of the circuit breaker and the timers does not work well.

SUMMARY OF THE INVENTION

It is an object of the present invention to resolve the problems encountered in the prior art device.

It is another object of the present invention to protect a motor by calculating an energization time of the motor or a power supplied to the motor and comparing it with a predetermined value to control the motor.

BRIEF DESCRIPTION OF THE DRAWINGS

FIG. 2 is a diagram of a first embodiment of the present invention,

DETAILED DESCRIPTION OF THE PREFERRED EMBODIMENTS

The passive seat belt device of the present invention will now be explained in detail.

Figure 1:
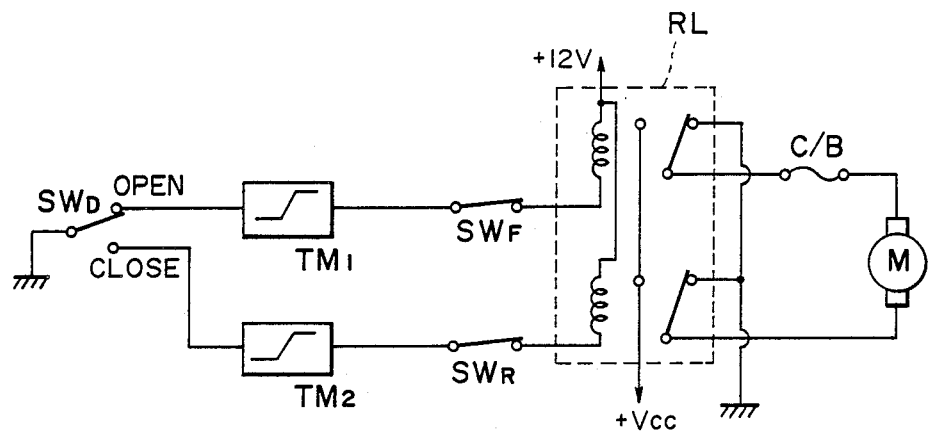
FIG. 1 is a diagram of a prior art circuit.

FIG. 2 shows a first embodiment of the present invention in which elements corresponding to those shown in FIG. 1 are designated by the same reference characters. The illustrative device includes an overload protection circuit PR, the operation of which will be explained later. The operation of the other circuits is the same as in the prior art circuit shown in FIG. 1.

Figure 3:
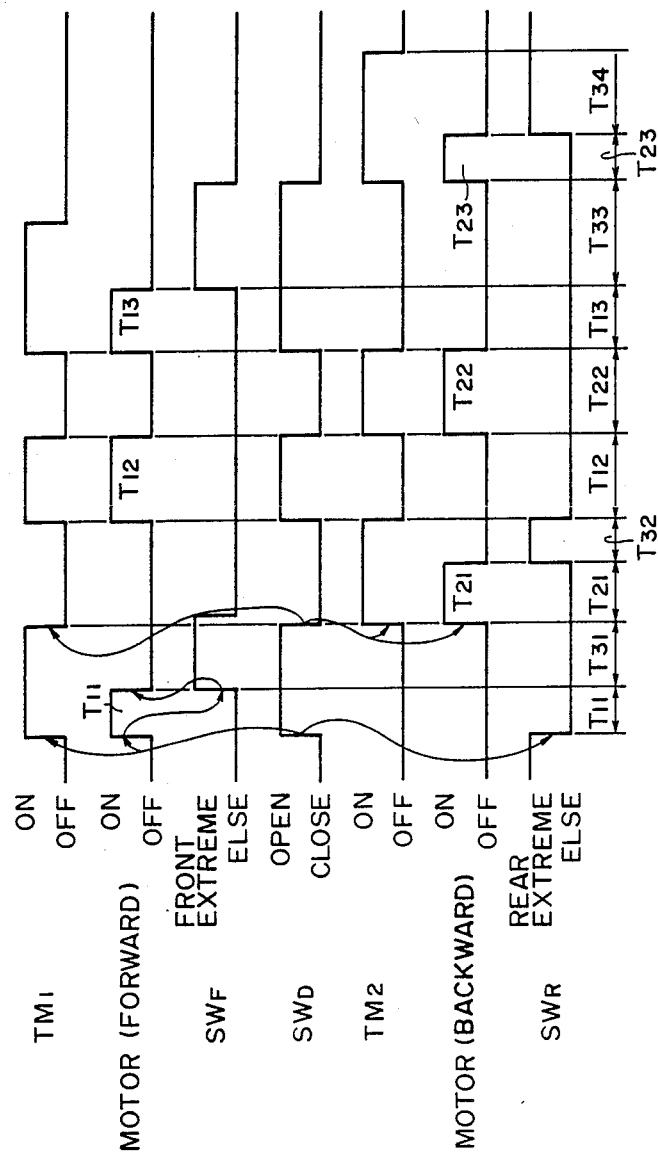
FIG. 3 is a timing chart for explaining a principle of operation of the present invention.

An operation timing diagram for the illustrative device is shown in FIG. 3.

Referring to the time period $T_{11}$, when the door is opened, the door switch $SW_D$ is thrown to the "open" position, the timer $TM_1$ is turned on, the relay circuit RL is energized, the motor is energized (forward energization) and the runner at the fasten end of the rail is moved toward the release end. When the runner moves off the fasten (rear) end, the limit switch $SW_R$ is turned on. This is denoted by the transition from "REAR EXTREME" to "ELSE" in FIG. 3 (i.e., switch $SW_F$ is off when the runner is at the rear end of the rail; else it is on). When the runner reaches the release end, the limit switch $SW_F$ is turned off ("FRONT EXTREME") and the motor is stopped.

Referring to time period $T_{21}$, when the door is then closed, the door switch is thrown to a "close" position, the timer $TM_1$ is turned off, the timer $TM_2$ is turned on, the relay circuit RL is energized, and the motor is rotated backward so that the runner at the release end is moved toward the fasten end. When the runner moves off the release end, the limit switch $SW_F$ is turned on. This is denoted by the transition from "FRONT EXTREME" to "ELSE." When the runner reaches the fasten end, the limit switch $SW_R$ is turned off ("REAR EXTREME") and the motor is stopped. The foregoing describes the operation timing under a normal condition.

A time period $T_{31}$ in FIG. 3 indicates a period from the arrival of the runner at the release end to the next closure of the door.

If the runner moves too slowly while the door remains open or closed within the set time of the corresponding timer $TM_1$ and $TM_2$, the runner does not reach the release end or the fasten end in periods $T_{12}$ or $T_{22}$ so that the motor is repeatedly rotated forward and backward as the door is opened and closed as shown by periods $T_{12}$, $T_{22}$ and $T_{13}$ in FIG. 3.

If the runner moves freely in period $T_{13}$, it reaches the release end in the period $T_{13}$ after the door is opened so that the limit switch $SW_F$ is turned off and the motor is deenergized.

Then, if the door is closed, each element works in periods $T_{23}$ and $T_{34}$ in a similar manner as in the periods $T_{21}$ and $T_{32}$.

The combined periods $T_{13}$, $T_{33}$, $T_{23}$ and $T_{34}$ in the time chart show a timing when the door is opened and closed at an interval exceeding the set time of the timers.

The control of the motor to prevent overload in accordance with the present invention will now be explained. For the purposes of discussion, it is taken that when the motor is alternately energized forward and backard, there will be no trouble in the motor and its peripheral circuit so long as the energization period does not exceed a predetermined period Tm. Three control modes are explained below.

(1) When the motor is continuously and repeatedly energized forward and backward as shown by the periods $T_{12}$, $T_{22}$ and $T_{13}$ in the timing chart of FIG. 3, the motor is controlled such that it will be deenergized for a fixed time period To (not shown) at a time when accumulation $\Sigma T \geq Tm$.

(2) If there is a time period in which the motor is not energized such as the periods $T_{31}$ and $T_{32}$ in FIG. 3, it is accumulated as a heat dissipation time, the accumulation $\Sigma T_3$ is multiplied by a factor k, and the product is subtracted from the accumulation $\Sigma T$ of the energization times $T_{11}$, $T_{21}$, $T_{12}$, $T_{22}$, $T_{13}$, and the motor is deenergized for the fixed time period To at a time when $\Sigma T - k\Sigma T_3 \geq Tm$.

(3) The deenergization times of the motor in the modes (1) and (2) are treated as the heat dissipation period, and the motor is deenergized at a time when $\Sigma T - k\Sigma T_3 - k\ To \geq Tm$.

With the foregoing control modes in mind and referring back to FIG. 2, the overload protection circuit PR for the motor in accordance with the present invention will now be explained.

When the motor is energized either forward or backward, one of lines $L_1$ and $L_2$ of the relay drive circuit is grounded and the relay is energized. In the present embodiment, the signals on the both lines are supplied to a NAND circuit, and an output thereof is supplied to a base of a transistor $TR_1$.

When at least one of the two input ports of the NAND circuit is Low, the output of the NAND circuit is High, which is supplied to an inverter INV so that the base of the $TR_1$ is Low. As a result, the $TR_1$ is turned on to charge up a capacitor C. When both of the input ports are High, the output of the NAND circuit is Low and the inverter INV supplies the High output to the base of the $TR_1$ to turn off the $TR_1$. Thus, the capacitor C is discharged through a resistor $R_1$ and a diode $D_1$.

By appropriately selecting the time constants of charging and discharging, the transistor circuit constitutes an integration circuit which charges when the motor is energized and discharges when the motor is deenergized, and a voltage corresponding to a difference between the accumulation $\Sigma T$ of the motor energization times and the accumulation $k\Sigma T_3$ of the heat dissipation times is developed across the capacitor C.

A circuit including a transistor $TR_2$ compares the output voltage of the capacitor C with a threshold level of a buffer IC (Bu), and if it is higher than the threshold level, turns off $TR_2$ to cut off the power supply line (Vout) to the relay circuit to stop the motor. In the present embodiment, the output voltage of the capacitor C is compared with the threshold level of the buffer. Alternatively, a conventional comparator may be provided to make comparison with a predetermined reference.

When $TR_2$ is turned off to cut off the power supply to the relay circuit, the runner has not yet reached the fasten end or the release end, and either $SW_F$ or $SW_R$ is on and hence either $L_1$ or $L_2$ is Low. Accordingly, the output of the NAND circuit is High and the capacitor C is not discharged through the resistor $R_1$ when the relay circuit is denergized and the motor is not rotated. However, since Vout is now Low, the capacitor C is discharged through a resistor $R_2$ and a diode $D_2$.

By appropriately selecting $R_1$ and $R_2$, the discharging of the capacitor C when the runner has been moved to the forward end or the rear end in the normal operation and the discharging of the capacitor C when the runner stops in between can be done at different time constants (although they may be done at the same time constant).

In the present embodiment, the output Vout of the overload protection circuit is examined, and the counting of the timers $TM_1$ and $TM_2$ is stopped when the output is not present (for example, by providing a circuit which supplies a voltage to a reset terminal of the timer in accordance with the output Vout). Thus, the earlier problem encountered when the timer and the circuit breaker are used is resolved. in FIG. 2, *1 and *2 denote such case, but the above-mentioned circuits for providing a reset signal are not shown.

Figure 4:
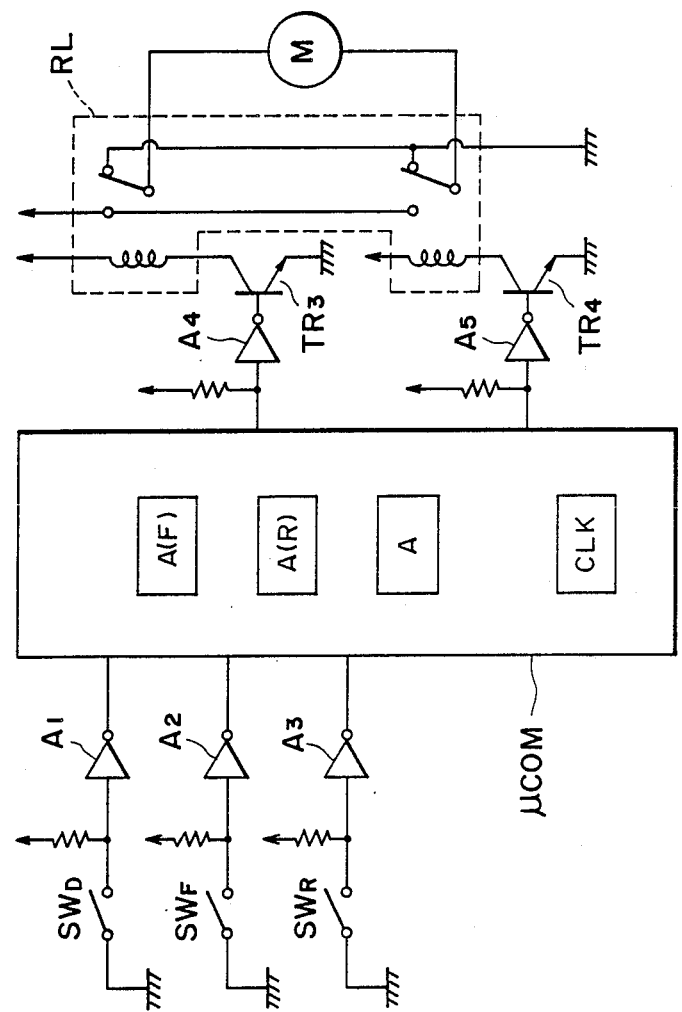
FIG. 4 is a diagram of a second embodiment of the present invention, FIG. 5, consisting of FIGS. 5A to 5D, is a flow chart for illustrating operation of the second embodiment.
Figure 5A:
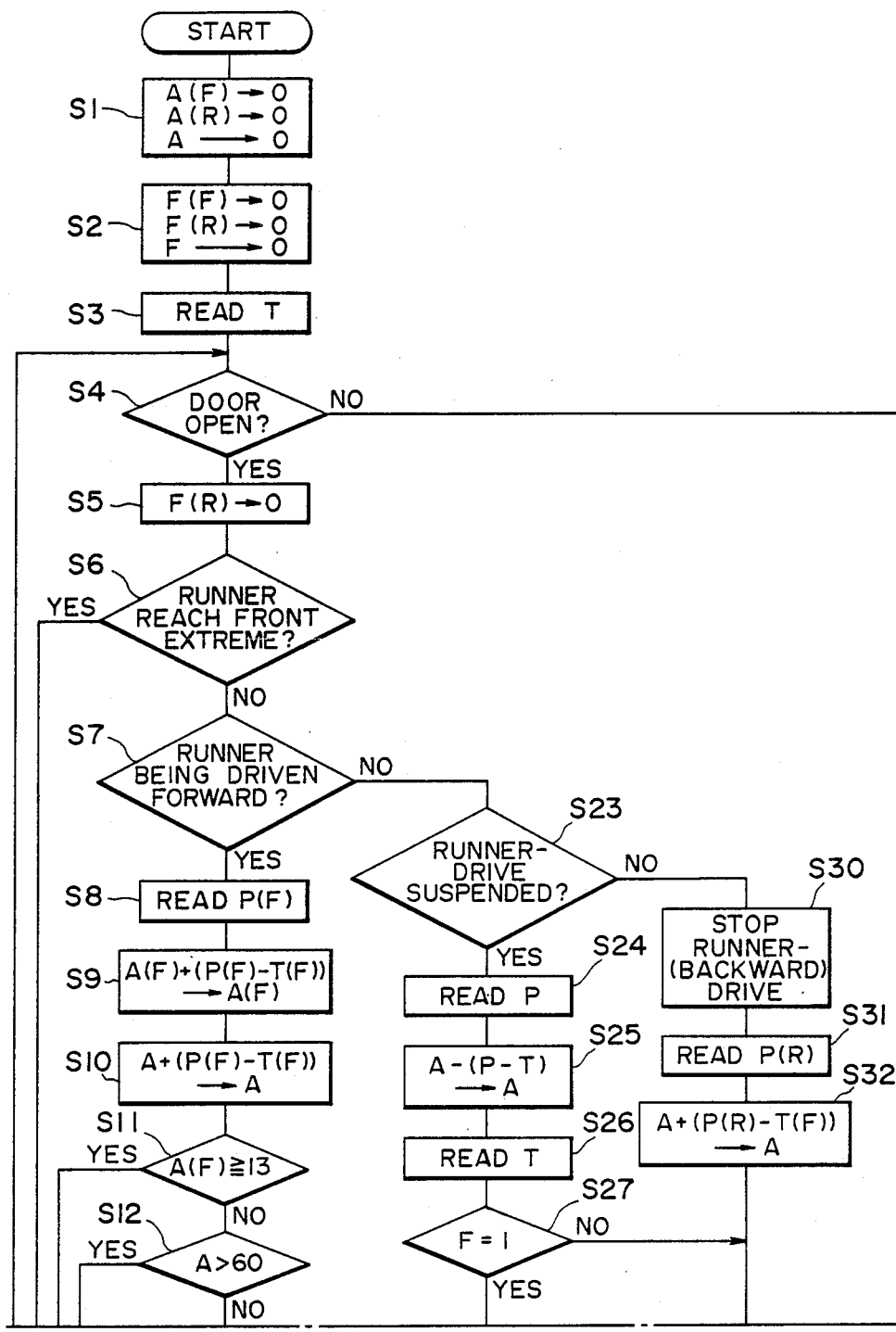
Figure 5B:
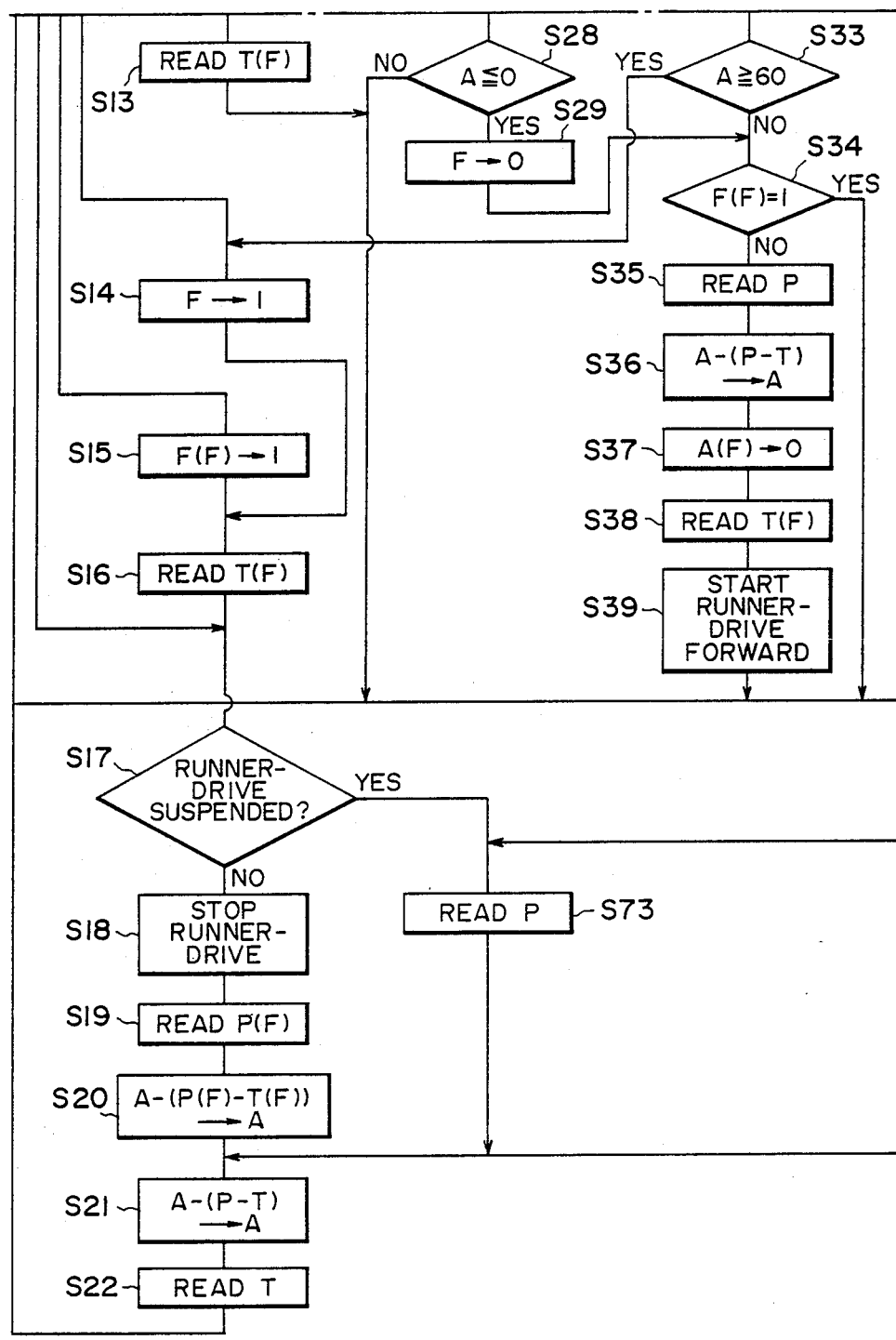
Figure 5C:
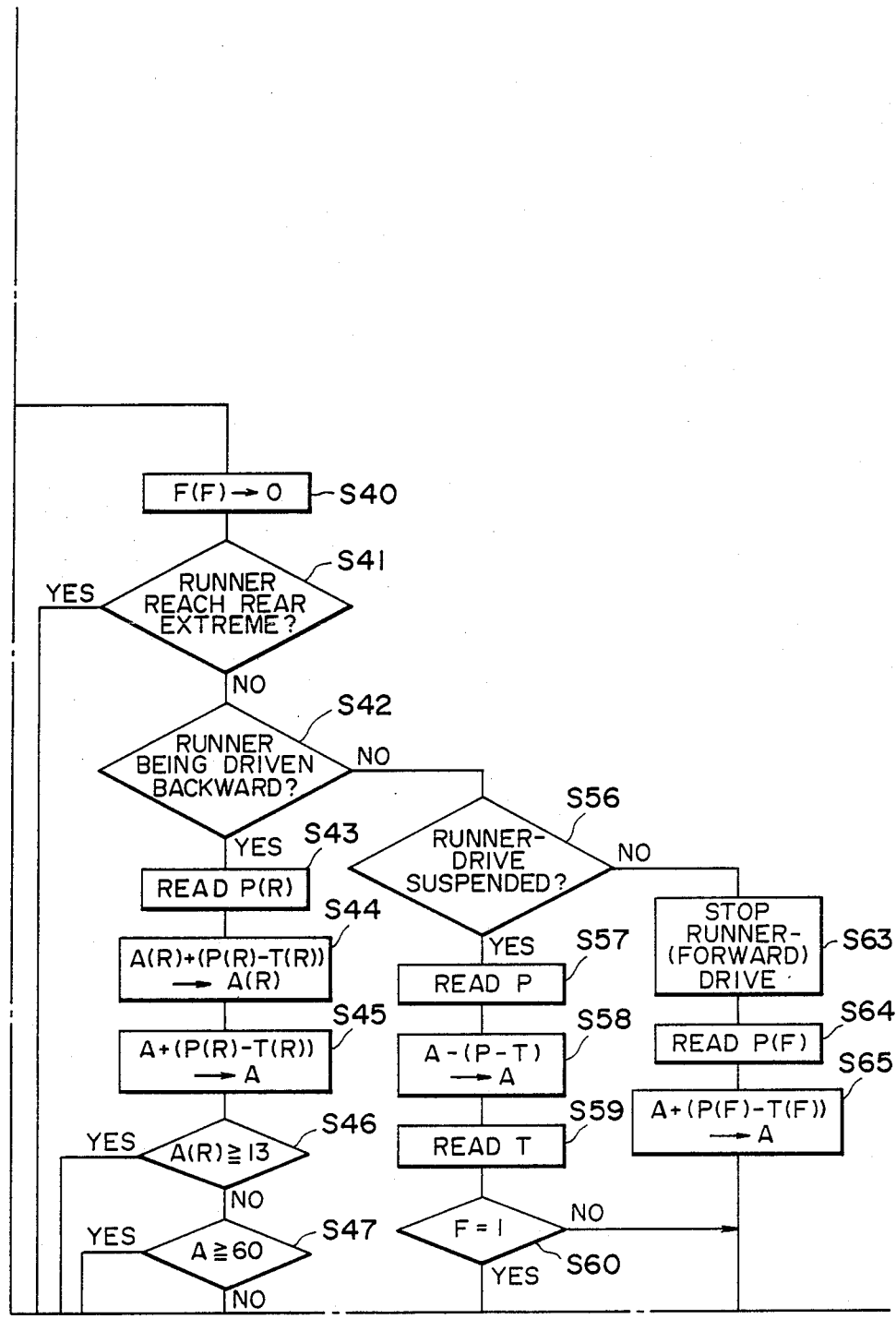
Figure 5D:
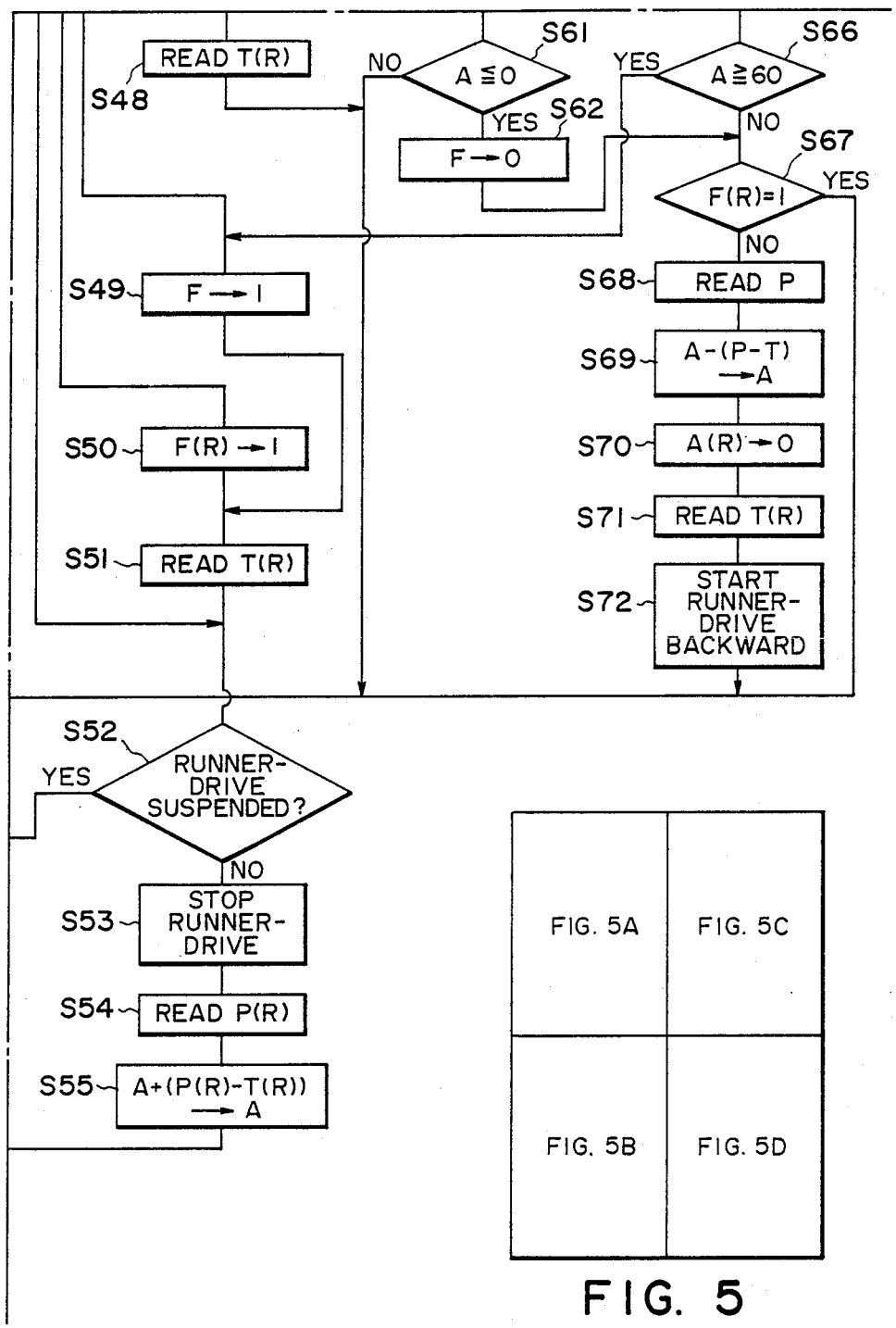

An embodiment which uses a microcomputer μCOM is shown in FIG. 4. A CPU counts the duration of an input signal to a driver transistor of a relay circuit by using an internal counter to control the energization of the relay circuit. A (F), A (R) and A in μCOM denote counters, and CLK denotes a clock signal generator. The door switch $SW_D$, forward drive switch $SW_F$ and backward drive switch $SW_R$ are connected to the microcomputer μCOM through inverters $A_1$, $A_2$, $A_3$, and the output of μCOM is supplied to driver transistors $TR_3$ and $TR_4$ of the relay circuit $R_L$ through inverters $A_4$ and $A_5$.

FIG. 5 shows a flow chart of the operation of the present embodiment. Codes and functions used in the flow chart are shown below.

| Counter | Function |
| --- | --- |
| A (F) | Accumulate forward energization time (e.g. 13 seconds) |
| A (R) | Accumulate backward energization time (e.g. 13 seconds) |
| A | Accumulate total energization time (e.g. 60 seconds) |

| Flag | Function |
| --- | --- |
| F (F) | It is set when the forward energization period (13 seconds) is exceeded and reset by a door close signal |
| F (R) | It is set when the backwad energization period (13 seconds) is exceeded and reset by a door open signal |
| F | It is set when the total energization period (60 seconds) is exceeded and rest after 60-second pause |

| Time | Meaning |
| --- | --- |
| T (F) | Start of forward energization |
| P (F) | Stop of forward energization |
| T (R) | Start of backward energization |
| P (R) | Stop of backward energization |
| T | Start of motor deenergization |
| P | End of motor deenergization |

A reference clock to count the motor energization/deenergization time is derived from a binary free running counter in the microcomputer, which converts it to a decimal time.

A power supply of the control unit is first turned on and the counters and flags are initialized (S1 and S2). The motor deenergization state is started and the time T is read (S3).

The open/close state of the door is checked (S4), and if it is the open state, the backward energization stop flag F (R) is cleared (S5).

Whether the runner is at the front end or not is checked (S6). Immediately after the door has been opened, the decision is normally "NO" and the process proceeds to a step S23, where there is a check whether the runner drive is suspended (that is, the runner is neither moved forward or moved backward). Normally, the decision is "YES" and the process proceeds to a step S24 where the time P is read and the motor deenergization time P−T is calculated. It is subtracted from the count of the counter A which monitors the accumulated motor energization time (if it exceeds 60 seconds, the motor is deenergized) to update the count of the counter A (S25). Then, the timer T is again read (S26).

Then, a check is made to determine whether the motor energization stop flag F (F="1" when the monitor time (60 seconds) is exceeded) is set or not (S27). If the decision is "NO", there is a check whether the updated count of the counter A is larger than 60 seconds (S33). If this decision is "NO", there is a check whether the forward energization flag F (F) (F (F)="1" when the 13-second period is exceeded) is set or not (S34). If the decision is "NO", the time P is read (S35), and the motor deenergization time is again calculated and it is subtracted from the count of the counter A to update the count of the counter A (S36). Then, the counter A (F) is reset (S37), the time T (F) is read (S38), the forward movement of the runner is started (S39) and the process returns to the step S4.

From the start of the forward movement of the runner to the arrival of the runner to the front (release) end, the decision in the step S6 is "NO" and the decision in the step S7 is "YES" and the process proceeds to a step S8. The time P (F) is read (S8), the forward energization time P (F)−T (F) is calculated, and it is added to the accumulation counter A (F) for monitoring the 13-second period and the accumulation counter A for monitoring the total energization period (60 seconds) to update A (F) and A (S9, S10).

The count of the counter A (F) is checked to determine if it is larger than 13 seconds (S11), and if the decision is "NO", the count of the counter A is checked to determine if it is larger than 60 seconds (S12). If the decision is "NO", the time T (F) is read (S13) and the process returns to the step S4. Thus, the runner is moved forward without the power supply being cut off.

If the count of the counter A (F) is larger than 13 seconds in the step S11, the forward energization stop flag F (F) is set (S15), the time T (F) is read (S16) and the runner is stopped.

In a step S17, whether the runner is being stopped or not is checked, and if the decision is "YES", the time P is read (S73), and the motor deenergization time P−T is subtracted from the count of the counter A to update the counter A (S21). The time T is again read (S22), and the process returns to the step S4.

If the runner is not found to be stopped at step S17, the runner is stopped at step S18, the time P (F) is read (S19), the runner forward energization time P (F)−T (F) is calculated and it is subtracted from the count of the counter A to update the counter A (S20). Then, the process proceeds to a step S21.

If the count of the counter A is larger than 60 seconds in the step S12, the motor energization stop flag F is set (S14) and the process proceeds to the step S16.

When the runner reaches the front (release) end, the decision in the step S6 is "YES" and the process jumps to the step S17 and the runner is stopped.

If the runner has not moved to the forward end ("NO" in S6) and the runner is not stopped ("NO" in S23), the backward runner drive is cut off (S30), the time P (R) is read (S31), the runner backward energization time P (R)−T (R) is calculated, and it is added to the count of the counter A to update the counter A (S32). Then the process proceeds to a step S33. The subsequent process is same as that described above.

If the flag F is set in the stop S27, the flag F is cleared (S29) if the count of the counter A is zero (logically "0" or negative), and the process proceeds to a step S34. If the count of the counter A is larger than zero, the process returns to the step S4.

In the step S33, if the count of the counter A is larger than 60 seconds, the process jumps to the step S14 and the flag F is set to stop the motor.

In the step S34, if the flag F (F) is set, the motor is stopped and the process returns to the step S4.

In the step S4, if the door is closed, the counters and flags for the forward movement of the runner are replaced by the counters and flags for the backward movement of the runner, and the function is exactly same.

In the present embodiment, the overload protection circuit and the timers are used in combination. The present invention is not limited thereto, and it may comprise only the overload protection circuit, the protection circuit and the circuit breaker, or the protection circuit and both the timers and the circuit breaker. When the circuit breaker is used, safety and reliability are improved.

Figure 6:
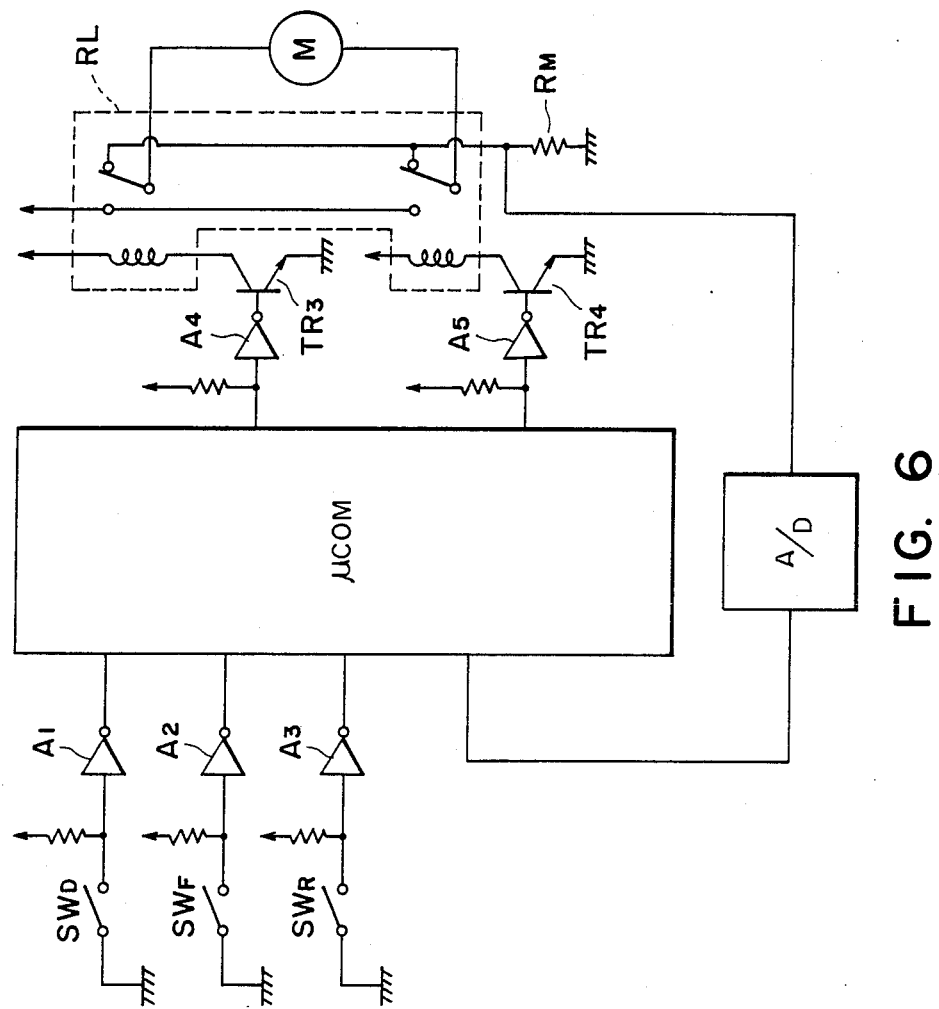
FIG. 6 is a diagram of a third embodiment of the present inventoion.

FIG. 6 shows another embodiment which uses a microcomputer. A resistor $R_M$ is connected in series with the motor, and a voltage across the resistor is supplied to the microcomputer μCOM through an A/D converter. The μCOM calculates power supplied to the motor based on the voltage across the resistor, and electric energy to be supplied is calculated based on the above calculation and the energization time. The motor is controlled in accordance with the calculated electric energy.

Figure 7:
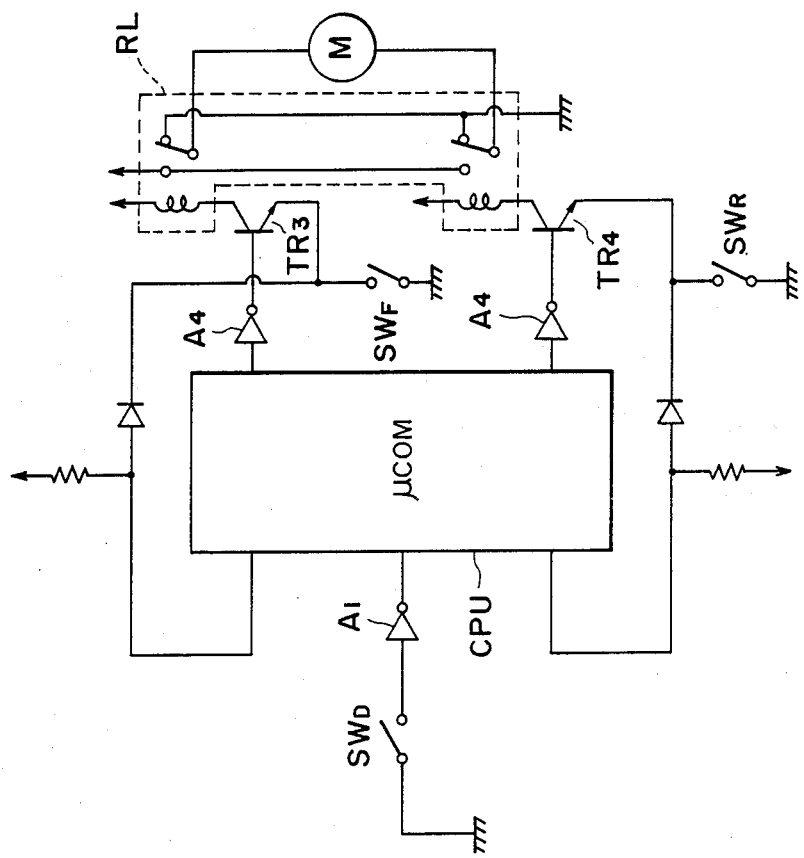
FIG. 7 is a diagram of a fourth embodiment of the present invention.

In FIG. 7, the relay circuit is turned off by the forward drive $SW_F$ or the backward drive $SW_R$ to stop the motor, and then the μCOM turns off the relay drive transistors $TR_3$ and $TR_4$. The rest of the operation is similar to that of the second embodiment.

The passive seat belt device of the present invention offers a number of advantages.

The seat belt device of the present invention accumulates the energization time of the motor or the power supplied to the motor which drives the seat belt runner and stops the motor for a fixed time period in accordance with the accumulation. Accordingly, overload of the motor is positively prevented, the motor is efficiently controlled, and safety and reliability are improved.

What we claim is:

1. A passive seat belt device for automatically fastening and releasing a seat belt, having a driving unit comprising:
   a motor for driving the seat belt between a fasten position and a release position, and
   means responsive to states of motor energization and motor deenergization for controlling said motor as a function of motor energization time and motor deenergization time in such a manner as to prevent overload of said motor, said controlling means comprising a capacitor which charges during periods of motor energization and which discharges during periods of motor deenergization.

2. A passive seat belt device according to claim 1, wherein said controlling means controls said motor in accordance with the voltage across said capacitor.

3. A passive seat belt device according to claim 2, wherein said controlling means cuts off power to said motor when the voltage across said capacitor exceeds a predetermined voltage.

4. A passive seat belt device according to claim 3, wherein said cut off of power is for a fixed predetermined time.

5. A passive seat belt device according to claim 3, wherein said controlling means includes first circuit means for charging and discharging said capacitor during normal periods of motor energization and deenergization and second circuit means for discharging said capacitor during said cut off of power.

6. A passive seat belt device for automatically fastening and releasing a seat belt, having a driving unit comprising:
   a motor for driving the seat belt between a fasten position and a release position, and
   means responsive to states of motor energization and motor deenergization for controlling said motor as a function solely of motor energization time and motor deenergization time in such a manner as to prevent overload of said motor, and
   wherein said controlling means cuts off power to said motor if alternate periods of motor energization and deenergization satisfy the condition:

$$\Sigma T - k\Sigma T_3 > Tm$$

where $\Sigma T$ represents the accumulated energization time of the periods of motor energization, $\Sigma T_3$ represents the accumulated deenergization time of the periods of motor deenergization, k is a coefficient, and Tm is a period of time predetermined to protect the motor against overload.

7. A passive seat belt device according to claim 6, wherein said controlling means cuts off power to said motor for a fixed predetermined time period if alternate periods of motor energization and deenergization satisfy the condition:

$$\Sigma T - k\Sigma T_3 - kTo \geq Tm$$

where the additional symbol To represents the duration of said fixed predetermined time period.

8. A passive seat belt device for automatically fastening and releasing a seat belt, having a driving unit comprising:
   a motor for driving the seat belt between a fasten position and a release position, and
   means responsive to states of motor energization and motor deenergization for controlling said motor as a function solely of motor energization time and motor deenergization time in such a manner as to prevent overload of said motor, and
   wherein said controlling means integrates the motor energization time over successive periods of motor energization and adjusts the integrated motor energization time for deenergization time of intervening periods of motor deenergization, said controlling means controlling said motor in accordance with the adjusted integrated motor energization time.

9. A passive seat belt device according to claim 8, wherein said controlling means cuts off power to said motor when the adjusted integrated motor energization time exceeds a predetermined limit.

10. A passive seat belt device according to claim 9, wherein said cut off of power by said controlling means is for a fixed predetermined time period.

11. A passive seat belt device according to claim 8, wherein the integrated motor energization time is adjusted by subtracting therefrom the product of the combined duration of said intervening periods and a coefficient.

12. A passive seat belt device for automatically fastening and releasing a seat belt, having a driving unit comprising:
   a motor for driving the seat belt between a fasten position and a release position, and
   means responsive to states of motor energization and motor deenergization for controlling said motor as a function of motor energization time and motor deenergization time in such a manner as to prevent overload of said motor, said controlling means comprising a microcomputer which accumulates motor energization time over successive periods of motor energization and which makes subtractions from the accumulated motor energization time based on the durations of intervening periods of motor deenergization to obtain an adjusted accumulated motor energization time, said microcomputer controlling said motor in accordance with the adjusted accumulated motor energization time.

* * * * *